United States Patent
Kobayashi

(10) Patent No.: US 8,012,600 B2
(45) Date of Patent: Sep. 6, 2011

(54) MATERIAL FOR ELECTRIC CONTACT AND METHOD OF PRODUCING THE SAME

(75) Inventor: Yoshiaki Kobayashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 390 days.

(21) Appl. No.: 12/210,567

(22) Filed: Sep. 15, 2008

(65) Prior Publication Data

US 2009/0081477 A1    Mar. 26, 2009

Related U.S. Application Data

(63) Continuation of application No. PCT/JP2007/055285, filed on Mar. 15, 2007.

(30) Foreign Application Priority Data

Mar. 17, 2006  (JP) .................................. 2006-075231
Mar. 14, 2007  (JP) .................................. 2007-065855

(51) Int. Cl.
*B32B 15/04*    (2006.01)

(52) U.S. Cl. ......... 428/687; 428/637; 205/170; 205/176
(58) Field of Classification Search .................. None
See application file for complete search history.

(56) References Cited

U.S. PATENT DOCUMENTS 6,245,445 B1 *    6/2001    Lykins, II .................... 428/626
2003/0207149 A1    11/2003    Kobayashi et al.

FOREIGN PATENT DOCUMENTS

| JP | 3-191084 A | 8/1991 |
| JP | 6-349370 A | 12/1994 |
| JP | 2001-43762 A | 2/2001 |
| JP | 2001-123292 A | 5/2001 |
| JP | 2003-203534 A | 7/2003 |
| JP | 2009245659 A * | 10/2009 |

OTHER PUBLICATIONS

International Search Report of PCT/JP2007/055285, date of mailing Apr. 17, 2007.

* cited by examiner

*Primary Examiner* — Aaron Austin
(74) *Attorney, Agent, or Firm* — Westerman, Hattori, Daniels & Adrian, LLP

(57) ABSTRACT

A material for electric sliding contact comprising, on a conductive substrate, a first layer composed of a noble metal or an alloy comprising the noble metal as a major component with an arithmetic average roughness Ra of (A) μm and, as an upper layer of the first layer, a second layer composed of a noble metal or an alloy comprising the noble metal as a major component with a covering thickness of from 0.001×(A) μm or more to (A) μm or less, wherein the noble metal forming the second layer or the noble metal as a major component of the alloy forming the second layer is a different element from the noble metal forming the first layer or the noble metal as a major component of the alloy forming the first layer.

6 Claims, 2 Drawing Sheets

Ra= (A) μm

MATERIAL FOR ELECTRIC CONTACT AND METHOD OF PRODUCING THE SAME

This application claims priority to Patent Application No. 2006-075231 filed in Japan on Mar. 17, 2006, and Patent Application No. 2007-065855 filed in Japan on Mar. 14, 2007, each of which is entirely incorporated herein by reference.

TECHNICAL FIELD

The present invention relates to a material for an electric contact and to a method of producing the same.

BACKGROUND ART

While copper or copper alloys excellent in electric conductivity have been used for electric contact parts for a long time, the number of cases of using naked copper or copper alloys is decreasing in recent years due to improvement of contact point characteristics, and materials prepared by applying various surface treatments on copper or copper alloys are being produced and used. In particular, the electric contact parts are often plated with noble metals for many uses as materials for electric contacts. Noble metals such as gold, silver, palladium, platinum, iridium, rhodium and ruthenium have been used for various electric contact materials due to their stability and excellent electric conductivity. In particular, silver has been widely used in many industrial fields since it is most excellent in electric conductivity among the metals and is relatively inexpensive among the noble metals. In addition, various materials have been produced by cladding electric contact parts with these noble metals.

Materials for electric contacts considered to be excellent in wear resistance have been used for electric contact parts that experience repeated insertion/desertion or sliding in recent years. These include connector terminals of harnesses in automobiles, contact switches mounted in portable phones, and terminals of memory cards and PC cards. With respect to improvement in wear resistance, materials for contacts using hardened silver and hardened gold have been commonly used for a general purpose. Other examples of research and development include clad materials and plated materials in which micro-particles are dispersed, and various surface-treated materials have been developed for improving sliding characteristics of the materials for electric contacts. For example, JP-A-03-191084 ("JP-A" means unexamined published Japanese patent application) has attempted to improve wear resistance and corrosion resistance by covering a nickel plating as a underlayer, a palladium plating as an intermediate layer, and a gold plating as a top layer, on a copper base material having a given hardness and surface toughness, wherein the Vickers hardness and surface roughness (Rz) of the base material are adjusted to be 230 or less and 45 μm or less, respectively, while the plating layers are composed of a semi-bright or matte nickel plating with a thickness of 3.0 μm or less as the intermediate layer, a bright palladium or bright palladium-nickel alloy plating with a thickness of 1.5 μm or less as the intermediate layer, and a gold or gold alloy plating with a thickness from 0.1 to 0.5 μm.

DISCLOSURE OF INVENTION

However, in the material for electric contacts treated with a conventional hardened silver or hardened gold, noble metals used for portions where it is necessary to slide are readily worn when used for such portions where it is necessary to slide, and the sliding contact material often showed defective conductivity due to exposure of the surface of the substrate. While the thickness of the noble metal layer may be increased for improving slide resistance, this is not advantageous since the production cost increases due to a large amount of use of expensive noble metals. In the plating material described in JP-A-03-191084, the base metal and plating metals to be processed are defined with a description of ten-point average roughness Rz of the surface of the base metal. However, while a noble metal layer of the sliding contact material has been formed by a cladding method, this method involves a problem of high production cost with a large amount of use of the noble metal since thinning of the coating layer in the order of μm to nm is impossible by the currently available technologies of cladding.

For solving the above-mentioned problems, the present invention contemplates providing a material for electric contacts being excellent in sliding characteristics and wear resistance, and having a long service life, while the material can be produced with a low production cost, and a method of producing the same.

As a result of advanced studies for solving the above-mentioned problems, the inventor of the present invention has found that the material for electric contacts can be endowed with excellent wear resistance and sliding characteristics by providing a first layer composed of a noble metal or an alloy comprising the noble metal as a major component with an arithmetic average roughness Ra of (A) μm on a conductive substrate, and a second layer with a thickness from 0.001×(A) μm or more to (A) μm or less on the first layer, wherein the second layer comprises a noble metal or an alloy of the noble metal other than the element that forms the first layer or an alloy thereof. While the noble metal of the second layer that serves as the top surface is worn to a certain extent by initial contact and sliding when it is used as a contact material, powders of the worn noble metal are preferentially embedded into uneven portions on the covering that is formed to be the first layer having an arithmetic average roughness Ra of (A) μm composed of the noble metal or an alloy comprising the noble metal as a major component. Consequently, the noble metal in the second layer is embedded into grooves on the surface of the first layer without being oxidized or denatured, and electrical contact may be apparently regarded as a contact state between a plurality of different noble metals. Therefore, the service life as a sliding contact material is improved by ductile and lubricating effects of the noble metals to enable stable contact resistance to be obtained. The present invention has been accomplished based on the above-mentioned findings.

According to the present invention, the following means are provided.

(1) A material for electric contact, comprising, on a conductive substrate, a first layer composed of a noble metal or an alloy comprising the noble metal as a major component, with an arithmetic average roughness Ra of (A) μm, and, as an upper layer of the first layer, a second layer composed of a noble metal or an alloy comprising the noble metal as a major component, with a covering thickness of from 0.001×(A) μm or more to (A) μm or less, and wherein the noble metal forming the second layer or the noble metal as a major component of the alloy forming the second layer is a different element from the noble metal forming the first layer or the noble metal as a major component of the alloy forming the first layer.

(2) The material for electric contact according to item (1), wherein the (A) is in the range of from 0.05 to 0.5.

(3) The material for electric contact according to item (1) or (2), wherein at least one layer of the first layer and the second layer is formed by plating.

(4) A method of producing the material for electric contact according to item (1) or (2), comprising the step of: forming at least one layer of the first layer and the second layer by plating.

Other and further features and advantages of the invention will appear more fully from the following description, appropriately referring to the accompanying drawings.

BEST MODE FOR CARRYING OUT THE INVENTION

Figure 1:
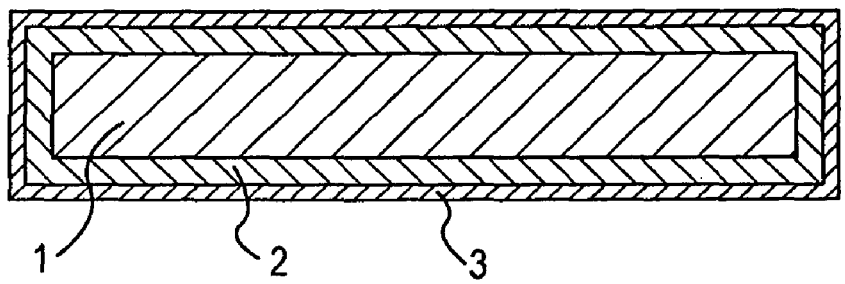
FIG. 1 is a cross section schematically illustrating an embodiment of the present invention.

The material for electric contact of the present invention comprises, on a conductive substrate, a first layer composed of a noble metal or an alloy comprising the noble metal as a major component, with an arithmetic average roughness Ra of (A) μm, and, on the first layer, a second layer composed of a noble metal or an alloy comprising the noble metal as a major component, with a thickness from 0.001×(A) μm or more to (A) μm or less, and wherein the noble metal that forms the second layer or the noble metal that is a major component of the alloy that forms the second layer is an element different from the noble metal that forms the first layer or the noble metal that is a major component of the alloy that forms the first layer. The alloy having the noble metal as a major component refers to an alloy comprising 50% by mass or more, preferably 80% by mass or more, of the noble metal.

In addition, when the first layer and second layer each contain the same noble metal element, when the mass ratio between the noble metal element and another element is 50% by mass in the first layer, and when the mass ratio between the noble metal element and another element is 50% by mass in the second layer, the present invention is defined as follows.

(1) When at least one of another element in the first layer and another element in the second layer is a noble metal, the proportion of the another noble metal element accounts for 50% by mass, so that it is defined that the noble metal element as the major component of the first layer is different from the noble metal element as the major component of the second layer.

(2) When neither another element in the first layer nor another element in the second layer is a noble metal element, so long as another element in the first layer is not the same element as another element in the second layer, the noble metal element as the major component of the first layer is particularly regarded as a different element from the noble metal element that is the major component of the second layer in the present invention.

(3) When another element in the first layer is the same as another element in the second layer, the composition of the first layer is the same as the composition of the second layer, so that the noble metal element as the major component of the first layer is not regarded as a different element from the noble metal element as the major component of the second layer.

Further, when another element in the first layer is the same noble metal element as another element in the second layer, and when the mass ratio of the noble metal element as another element in any one of the first layer and second layer is less than 50% by mass while the mass ratio of the noble metal element as another element of the other layer of the first layer and second layer is 50% by mass, so that it is defined that the noble metal element as the major component of the first layer is different from the noble metal element as the major component of the second layer.

Figure 2:
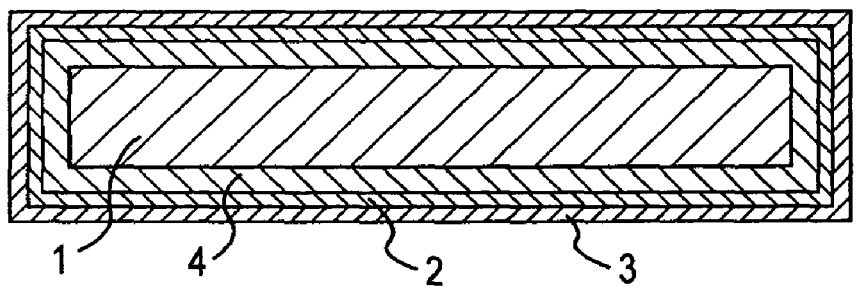
FIG. 2 is a cross section schematically illustrating another embodiment of the present invention.
Figure 3:
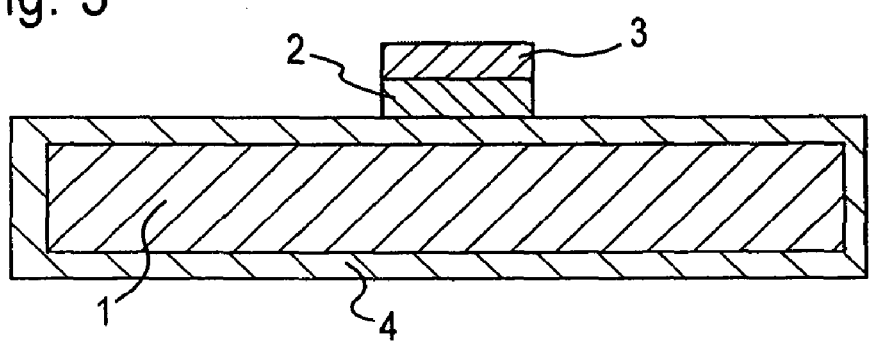
FIG. 3 is a cross section schematically illustrating a further different embodiment of the present invention.
Figure 4:
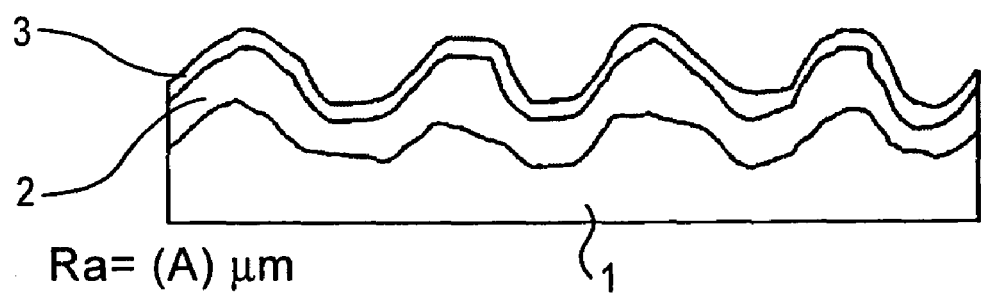
FIG. 4 is a partially magnified cross section schematically illustrating a boundary between the first layer and second layer according to an embodiment of the present invention.
Figure 5:
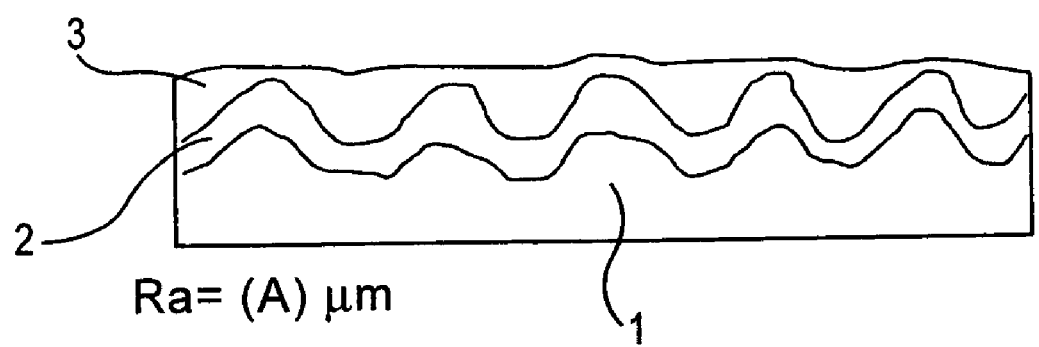
FIG. 5 is a partially magnified cross section schematically illustrating a boundary according to another embodiment of the present invention.

FIG. 1 is a cross section schematically illustrating an embodiment of the present invention. The first layer 2 is provided on the surface of the conductive substrate 1 in this embodiment, and the second layer 3 is further provided on the first layer. FIG. 2 is a cross section schematically illustrating another embodiment of the present invention. An underlayer 4 of the covering layer composed of the first layer 2 and second layer 3 is provided on the conductive substrate 1 in this embodiment. FIG. 3 is a cross section schematically illustrating a further different embodiment of the present invention. The underlayer 4 is provided on the conductive substrate 1 in this embodiment, and a covering layer composed of the first layer 2 and second layer 3 is locally provided on the underlayer 4 so that the production cost is reduced by saving the amount of use of the noble metal. With regard to FIG. 3, the underlayer 4 may be locally provided on the conductive substrate 1, for example may be provided only at the portion where the covering layer composed of the first layer 2 and second layer 3 is provided (in accordance with the shape of the covering layer). While the boundary between the first layer 2 and second layer 3 is shown by a liner line as a simplified illustration in FIGS. 1 to 3, the surface of the first layer 2 on the conductive substrate 1 is practically uneven with an arithmetic average roughness Ra of (A) μm, and the second layer 3 is formed with a thickness from 0.001×(A) μm or more to (A) μm or less as shown schematically in FIG. 4 which is a partially magnified cross section of a boundary between the first layer and second layer. It is possible as shown in the partially magnified cross section in FIG. 5 that the second layer 3 is formed dense on concave portions and thin on convex portions when bright plating is applied on the second layer 3. Otherwise, the surface may be slightly shaved by lapping after plating so that the second layer 3 is coated on only the shaved concave portions. The thickness of the second layer 3 is defined by an arithmetic average thickness when the second layer is applied dense on the concave portion and thin on the convex portion.

Copper, nickel or iron, or an alloy of these metals, or a composite material prepared by covering copper or a copper alloy on a steel or aluminum material is employed for the conductive substrate used for the material for electric contact of the present invention.

While the underlayer of the first layer may be provided or not provided in the material for electric contact of the present invention, an underlayer composed of nickel or an alloy of nickel, cobalt or an alloy of cobalt, or copper or an alloy of copper may be provided, for example, as a barrier of diffusion of the components in the substrate or for improving adhesiveness of the substrate. When a layer of a metal having a higher ionization potential than the conductive substrate is formed by plating, in particular, an underlayer treatment such as flush plating or strike plating is effective for improving adhesiveness and for preventing substitution. Plural underlayers may be provided, and various constitutions of the underlayer are preferably provided depending on applications such as specification of covering. The preferable thickness of the underlayer is from 0.1 to 1.0 μm in total.

The first layer composed of a noble metal or an alloy having the noble metal as a major component, with an arithmetic average roughness Ra of (A) μm, is a noble metal layer excellent in electric conductivity. The (A) is preferably from 0.05 to 0.5, more preferably from 0.1 to 0.2. Wear resistance as a sliding contact material is decreased when the (A) exceeds 0.5 due to large surface roughness, and sliding characteristics become poor. While the thickness of the first layer is not particularly restricted, the thickness of the first layer as a covering layer is desirably from about 0.2 to about 5 μm since larger thickness of the noble metal layer results in an increased production cost.

In the present invention, the noble metals that form the first layer and second layer in the present invention have positive standard electrode potentials. Examples of the noble metal include gold, silver, copper, palladium, platinum, iridium, rhodium and ruthenium. Gold, silver, palladium and platinum are preferable.

However, the noble metal that forms the first layer or the noble metal as a major component of the alloy that forms the first layer is different from the noble metal that forms the second layer or the noble metal as a major component of the alloy that forms the second layer.

The second layer is a covering layer with a thickness of (A) μm or less composed of a noble metal other than the element applied in the first layer or an alloy thereof. The second layer protects the first layer, and is a different noble metal layer from the first layer having good conductive characteristics. While the second layer serves as an initial sliding surface, a layer having low contact resistance characteristics necessary for a contact material as well as surface lubricity and wear resistance necessary for a sliding contact material may be formed by embedding the second layer into the concave portions of the uneven surface of the first layer with a roughness Ra of (A) μm. The amount of the second layer may be just enough for being embedded in the concave portion of the first layer, and the thickness of the second layer is from 0.001×(A) μm or more to (A) μm or less, preferably from 0.001×(A) μm to 0.5×(A) μm. The first layer is covered with the second layer at a thickness of roughness Ra of (A) μm or more as defined for the first layer, when the thickness of the second layer is more than (A) μm. This thickness impairs the effect of the second layer while the production cost is increased due to the increased use of the noble metal.

While various covering film forming methods such as plating, cladding, vapor deposition and sputtering may be used for producing the material for electric contact of the present invention, at least one layer of the first layer and second layer is preferably provided by plating, and it is more preferable to form both the first and second layers by plating. While conventionally used plating methods may be appropriately selected for use, an electroplating method is preferable as a method of facilitating thin films to be formed. Conventionally used compositions of the electroplating liquid and conventionally used electroplating conditions may be used. It is useful to locally apply the first layer or second layer, or both layers, as stripes or spots in order to suppress the necessary amount of the noble metal.

The covering layer of the present invention is applicable irrespective of the surface appearance of the layer such as bright, semi-bright and matte surfaces. While a sufficient effect may be obtained only by the present invention, various additives, dispersion agents and dispersed particles may be preferably compounded in at least one layer for enhancing the effect of the present invention.

The present invention enables an electric contact material excellent in sliding characteristics and wear resistance and having a long service life to be produced with a low production cost.

EXAMPLES

The present invention will be described in more detail based on examples given below, but the invention is not meant to be limited by these.

After applying pre-treatments such as electrolytic degreasing and acid washing to a C14410 belt (copper substrate) with a thickness of 0.3 mm and a width of 18 mm, plated base materials as shown in Table 1 were produced to obtain the materials for electric contacts in examples of the present invention and in comparative examples.

The thickness of each plating layer was calculated as an average value of the thickness measured at 10 points on an arbitrary surface using a fluorescent X-ray film thickness measuring apparatus (trade name: SFT 9400, manufactured by SII) with a collimator diameter of 0.5 mm and a measuring time of 60 seconds.

TABLE 1

Details of Examples of the present invention and Comparative Example

|  | Existence of Underlayer/ Thickness of the layer (μm) | First Layer/Thickness (μm)/Ra (μm) | Second Layer/ Thickness (μm) |
|---|---|---|---|
| Example 1 | None | Ag/4.0/0.3 | Au/0.01 |
| Example 2 | Ni/0.5 and Ag Strike/0.2 | Ag/4.0/0.3 | Au/0.01 |
| Example 3 | Co/0.5 and Ag Strike/0.2 | Ag/4.0/0.3 | Au/0.01 |
| Example 4 | Cu/0.5 and Ag Strike/0.2 | Ag/4.0/0.3 | Au/0.01 |
| Example 5 | Ni/0.5 and Ag Strike/0.2 | Ag/4.0/0.3 | Au/0.001 |
| Example 6 | Ni/0.5 and Ag Strike/0.2 | Ag/4.0/0.3 | Au/0.3 |
| Example 7 | None | Ag/4.0/0.3 | Pd/0.01 |
| Example 8 | None | Ag/4.0/0.3 | Pd—Ni Alloy/0.01 |
| Example 9 | None | Ag/4.0/0.3 | Ru/0.01 |
| Example 10 | None | Pd/1.0/0.2 | Au/0.01 |
| Example 11 | None | Pd/1.0/0.2 | Au/0.001 |
| Example 12 | Ni/0.5 | Pd/1.0/0.2 | Au/0.01 |
| Example 13 | Cu/0.5 | Pd/1.0/0.2 | Ag/0.1 |
| Example 14 | Ni/0.5 and Ag Strike/0.2 | Bright Ag/4.0/0.15 | Au/0.01 |
| Example 15 | Ni/0.5 and Ag Strike/0.2 | Bright Ag/4.0/0.15 | Au/0.001 |
| Example 16 | None | Ag/4.0/0.05 | Au/0.01 |

TABLE 1-continued

Details of Examples of the present invention and Comparative Example

|  | Existence of Underlayer/ Thickness of the layer (μm) | First Layer/Thickness (μm)/Ra (μm) | Second Layer/ Thickness (μm) |
|---|---|---|---|
| Example 17 | None | Ag/4.0/0.1 | Au/0.01 |
| Example 18 | None | Ag/4.0/0.5 | Au/0.01 |
| Example 19 | None | Ag/0.5/0.3 | Au/0.01 |
| Comparative Example 1 | Ni/0.5 and Ag Strike/0.2 | Ag/4.0/0.3 | — |
| Comparative Example 2 | None | Ag/4.0/0.3 | Au/0.5 |
| Comparative Example 3 | None | Ag/4.0/0.6 | — |
| Comparative Example 4 | Ni/0.5 and Ag Strike/0.2 | Ag/4.0/0.3 | Ag/0.01 |
| Comparative Example 5 | None | Ag/4.0/0.03 | Au/0.01 |
| Comparative Example 6 | None | Ag/4.0/0.8 | Au/0.01 |

The composition of the plating liquid and plating conditions for above-mentioned plating are shown below.

[Ni Plating]
Plating liquid: Ni(NH$_2$SO$_3$H) 500 g/L, NiCl$_2$ 30 g/L, H$_3$BO$_3$ 30 g/L
Plating conditions: current density 15 A/dm$^2$, temperature 50° C.

[Co Plating]
Plating liquid: COSO$_4$ 400 g/L, NaCl 20 g/L, H$_3$BO$_3$ 40 g/L
Plating conditions: current density 5 A/dm$^2$, temperature 30° C.

[Cu Plating]
Plating liquid: CuSO$_4$·5H$_2$O 250 g/L, H$_2$SO$_4$ 50 g/L, NaCl 0.1 g/L
Plating conditions: current density 6 A/dm$^2$, temperature 40° C.

[Ag Strike Plating]
Plating liquid: AgCN 5 g/L, KCN 60 g/L, K$_2$CO$_3$ 30 g/L
Plating conditions: current density 2 A/dm$^2$, temperature 30° C.

[Ag Plating]
Plating liquid: AgCN 50 g/L, KCN 100 g/L, K$_2$CO$_3$ 30 g/L
Plating conditions: current density 0.5 to 3 A/dm$^2$, temperature 30° C.

[Bright Ag Plating]
Plating liquid: AgCN 5 g/L, KCN 100 g/L, K$_2$CO$_3$ 30 g/L, NaS$_2$O$_3$ 1.58 g/L
Plating conditions: current density 1 A/dm$^2$, temperature 30° C.

[Pd—Ni plating: Pd/Ni (%) 80/20]
Plating liquid: Pd(NH$_3$)$_2$Cl$_2$ 40 g/L, NiSO$_4$ 45 g/L, NH$_4$OH 90 mL/L, (NH$_4$)$_2$SO$_4$ 50 g/L
Plating conditions: current density 1 A/dm$^2$, temperature 30° C.

[Pd Plating]
Plating liquid: Pd(NH$_3$)$_2$Cl$_2$ 45 g/L, NH$_4$OH 90 mL/L, (NH$_4$)$_2$SO$_4$ 50 g/L
Plating conditions: current density 1 A/dm$^2$, temperature 30° C.

[Au Plating]
Plating liquid: KAu(CN)$_2$ 14.6 g/L, C$_6$H$_8$O$_7$ 150 g/L, K$_2$C$_6$H$_4$O$_7$ 180 g/L, EDTA-Co (II) 3 g/L, piperazine 2 g/L
Plating conditions: current density 1 A/dm$^2$, temperature 40° C.

[Ru Plating]
Plating liquid: RuNOCl$_3$·5H$_2$O 10 g/L, NH$_2$SO$_3$H 15 g/L
Plating conditions: current density 1 A/dm$^2$, temperature 50° C.

The results of measurements of the dynamic friction coefficient and contact resistance of the parts used for sliding contact under the following conditions, and the production cost are shown in Table 2 below with respect to the above-mentioned materials for electric contacts.

[Measurement of Dynamic Friction Coefficient]
The dynamic friction coefficient was measured using a Bauden friction test equipment. The measuring conditions were as follows:
R=2.0 mm, steel ball probe, slide distance 10 mm, slide rate 100 mm/min, reciprocating No. of sliding 100 times, load 10 g, 65% Rh, 25° C.

[Measurement of Contact Resistance]
The initial contact resistance after coating and the contact resistance after the measurement of the dynamic friction coefficient were measured by a 4-stylus method. The measuring conditions were Ag probe R=2 mm and a load of 10 g, and the resistance at a current intensity of 10 mA was measured.

TABLE 2

Result of Evaluation

|  | Initial contact resistance (mΩ) | Dynamic friction coefficient μk/contact resistance (mΩ) after 50 times of reciprocal sliding | Dynamic friction coefficient μk/contact resistance (mΩ) after 100 times of reciprocal sliding | Dynamic friction coefficient μk/contact resistance (mΩ) after 300 times of reciprocal sliding | Cost: low ↔ high ⊚○ΔX | Total evaluation: good ↔ poor ⊚○ΔX |
|---|---|---|---|---|---|---|
| Example 1 | <1 | 0.25/<1 | 0.25/<1 | 0.25/<1 | ○ | ○ |
| Example 2 | <1 | 0.25/<1 | 0.25/<1 | 0.25/<1 | ○ | ○ |
| Example 3 | <1 | 0.25/<1 | 0.25/<1 | 0.25/<1 | ○ | ○ |
| Example 4 | <1 | 0.25/<1 | 0.25/<1 | 0.25/<1 | ○ | ○ |
| Example 5 | <1 | 0.25/<1 | 0.3/<1 | 0.3/<1 | ○ | ○ |
| Example 6 | <1 | 0.15/<1 | 0.15/<1 | 0.15/<1 | Δ | ○ |
| Example 7 | <1 | 0.25/<1 | 0.25/<1 | 0.25/<1 | ○ | ○ |
| Example 8 | <1 | 0.25/<1 | 0.25/<1 | 0.25/<1 | ○ | ○ |
| Example 9 | <1 | 0.25/<1 | 0.25/<1 | 0.25/<1 | ○ | ○ |
| Example 10 | <1 | 0.25/<1 | 0.25/<1 | 0.25/<1 | ○ | ○ |
| Example 11 | <1 | 0.3/<1 | 0.3/<1 | 0.3/<1 | ○ | ○ |

TABLE 2-continued

| | Result of Evaluation | | | | | |
|---|---|---|---|---|---|---|
| | Initial contact resistance (mΩ) | Dynamic friction coefficient μk/contact resistance (mΩ) after 50 times of reciprocal sliding | Dynamic friction coefficient μk/contact resistance (mΩ) after 100 times of reciprocal sliding | Dynamic friction coefficient μk/contact resistance (mΩ) after 300 times of reciprocal sliding | Cost: low ↔ high ◎○ΔX | Total evaluation: good ↔ poor ◎○ΔX |
| Example 12 | <1 | 0.25/<1 | 0.25/<1 | 0.25/<1 | ○ | ○ |
| Example 13 | <1 | 0.2/<1 | 0.2/<1 | 0.2/<1 | ◎ | ◎ |
| Example 14 | <1 | 0.15/<1 | 0.15/<1 | 0.15/<1 | ○ | ◎ |
| Example 15 | <1 | 0.2/<1 | 0.2/<1 | 0.2/<1 | ○ | ○ |
| Example 16 | <1 | 0.25/<1 | 0.3/<1 | 0.35/<1 | ○ | ○ |
| Example 17 | <1 | 0.25/<1 | 0.25/<1 | 0.25/<1 | ○ | ○ |
| Example 18 | <1 | 0.27/<1 | 0.27/<1 | 0.27/<1 | ○ | ○ |
| Example 19 | <1 | 0.25/<1 | 0.25/<1 | 0.25/<1 | ○ | ○ |
| Comparative example 1 | <1 | 0.3/<1 | 0.4/3 | 0.7/6 | ◎ | Δ |
| Comparative example 2 | <1 | 0.2/<1 | 0.2/<1 | 0.2/<1 | X | Δ |
| Comparative example 3 | <1 | 0.3/<1 | 0.5/4 | 0.8/10 | ○ | X |
| Comparative example 4 | <1 | 0.3/<1 | 0.4/3 | 0.7/6 | ○ | Δ |
| Comparative example 5 | <1 | 0.25/<1 | 0.4/3 | 0.7/6 | ○ | Δ |
| Comparative example 6 | <1 | 0.3/<1 | 0.7/4 | 1.0/12 | ○ | X |

In Table 2, the costs required for producing the materials for electric contacts in the examples and comparative examples were classified into 4 stages (◎, ○, Δ and X) from the lower cost to the higher cost. The total evaluation was also classified into 4 stages (◎, ○, Δ and X) from the good to the poor evaluation. The ranks of ◎ and ○ are considered to be in a practically applicable level.

The above-mentioned results show that a stable dynamic friction coefficient and contact resistance are obtained in the examples. On the contrary, the contact resistance increases when the number of reciprocal sliding is about 100 times in the samples of Comparative Examples 1, 3, 4, 5 and 6. The production cost was high in the sample in Comparative Example 2. All these samples were not in a practically applicable level.

INDUSTRIAL APPLICABILITY

The material for electric contacts of the present invention can be used for the material for electric contacts subjected to repeated insertion/desertion or sliding such as connector terminals of the automobile harness, contact switches mounted on the portable phone and terminals of the memory card and PC card.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A material for electric sliding contact, comprising, on a conductive substrate, a first layer composed of a noble metal or an alloy comprising the noble metal as a major component, with an arithmetic average roughness Ra of (A) μm, and, as an upper layer of the first layer, a second layer composed of a noble metal or an alloy comprising the noble metal as a major component, with a covering thickness of from 0.001×(A) μm or more to (A) μm or less, and
   wherein the noble metal forming the second layer or the noble metal as a major component of the alloy forming the second layer is a different element from the noble metal forming the first layer or the noble metal as a major component of the alloy forming the first layer;
   wherein the average roughness Ra is in the range of from 0.05 to 0.5 μm.

2. The material for electric sliding contact according to claim 1, wherein at least one layer of the first layer and the second layer is formed by plating.

3. A method of producing the material for electric sliding contact according to claim 1, comprising the step of:
   forming at least one layer of the first layer and the second layer by plating.

4. The material for electric sliding contact according to claim 1, wherein the average roughness Ra is in the range of from 0.05 to 0.2 μm.

5. The material for electric sliding contact according to claim 1, wherein the average roughness Ra is in the range of from 0.1 to 0.2 μm.

6. An electrical sliding contact comprising the material of claim 1.

* * * * *